United States Patent [19]

Hertel et al.

[11] Patent Number: 5,427,201
[45] Date of Patent: Jun. 27, 1995

[54] PORTABLE WEDGING TREE STAND

[76] Inventors: Joseph B. Hertel; Cinthia R. Hertel, both of 2702 Elm St., Hays, Kans. 67601

[21] Appl. No.: 239,443
[22] Filed: May 9, 1994
[51] Int. Cl.$^6$ ............................................. A01M 31/02
[52] U.S. Cl. ...................................... 182/187; 182/92; 182/223
[58] Field of Search ................. 182/187, 188, 92, 223; 108/152

[56] References Cited

U.S. PATENT DOCUMENTS

| | | | |
|---|---|---|---|
| 3,762,502 | 10/1973 | Lawson | 183/223 |
| 3,944,022 | 3/1976 | Ming | 182/187 X |
| 4,445,591 | 5/1984 | Mitchell | 182/92 X |
| 4,730,699 | 3/1988 | Threlkeld | 182/187 |
| 4,787,476 | 11/1988 | Lee | 182/187 X |

*Primary Examiner*—Alvin C. Chin-Shue

[57] ABSTRACT

Disclosed is a new portable wedging tree stand for providing a small lightweight foldable tree fork engaging support for elevating an outdoor enthusiast above ground level for hunting, photography, bird watching, and the like. The portable wedging tree stand comprises a rectangular platform whereupon the user may stand. The platform has a longitudinal V-shaped notch formed in both ends thereof wherein tree trunk fork members may be engaged. A plurality of tree surface piercing teeth extends longitudinally from the notched ends of the platform whereby the platform may be stabilized to prevent unwanted rocking motion during use. The platform is foldable laterally for storage, transport, and to enable a leveraged wedging action whereby the longitudinal tree surface piercing teeth may be firmly set into the tree during installation of the stand. A sling extends from one corner of the platform to the diagonally opposing corner thereof whereby the portable tree stand may be suspended from the user's shoulder for easy transport thereof. The platform may be constructed of lightweight metal or hardwood. In an alternate embodiment, the portable wedging tree stand includes a detachable collapsible stool upon which the user may sit during use of the stand. The stool also has a V-shaped notch with a plurality of teeth projecting longitudinally therefrom whereby the seat may be stabilized to prevent unwanted motion. A seat retaining strap is included for cinching the tree fork member securely into the V-shaped notch of the seat for improved stability. A vertical support member with a plurality of lockable discrete extensible positions adjustably supports the seat spaced above the platform.

5 Claims, 4 Drawing Sheets

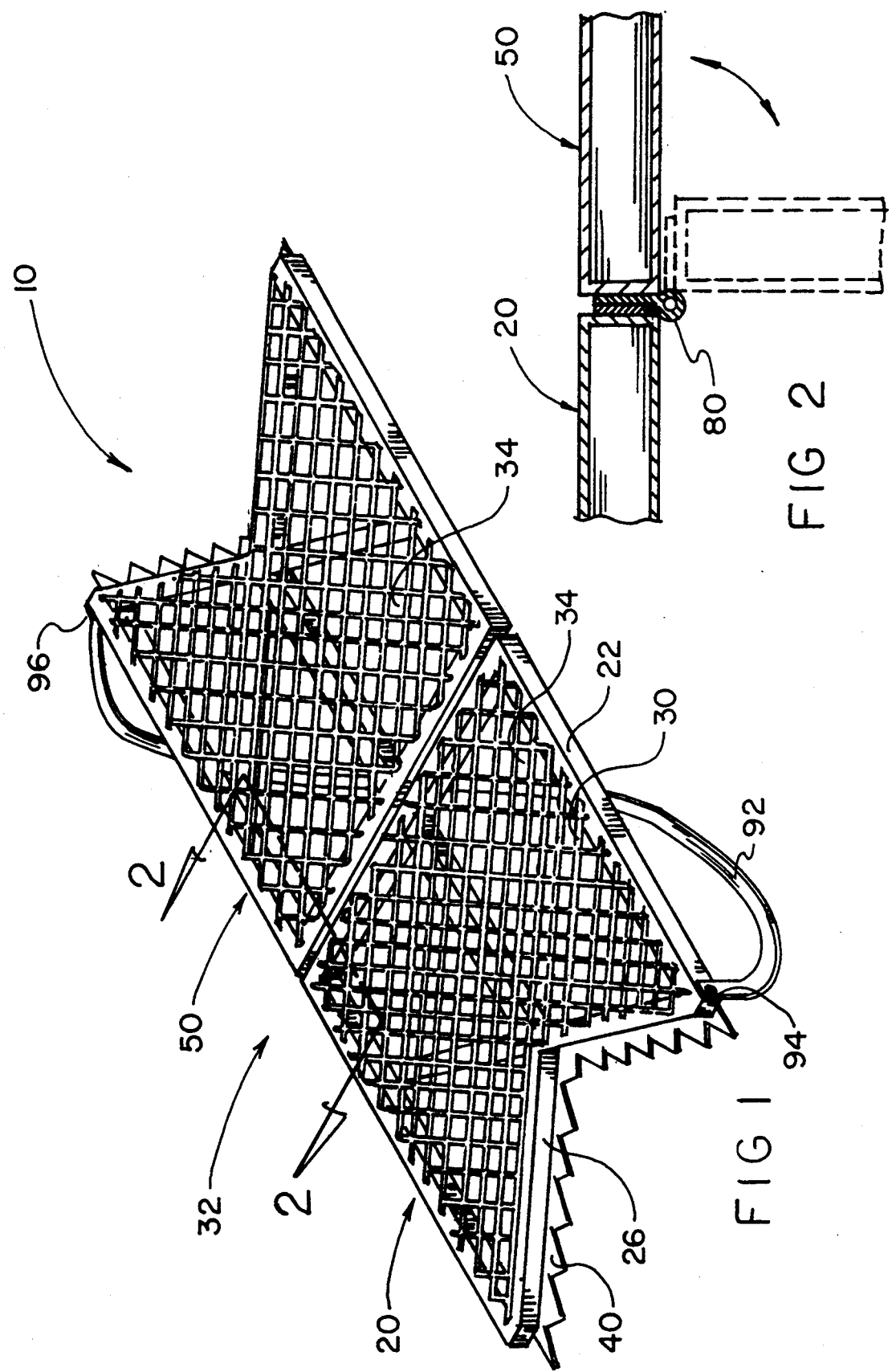

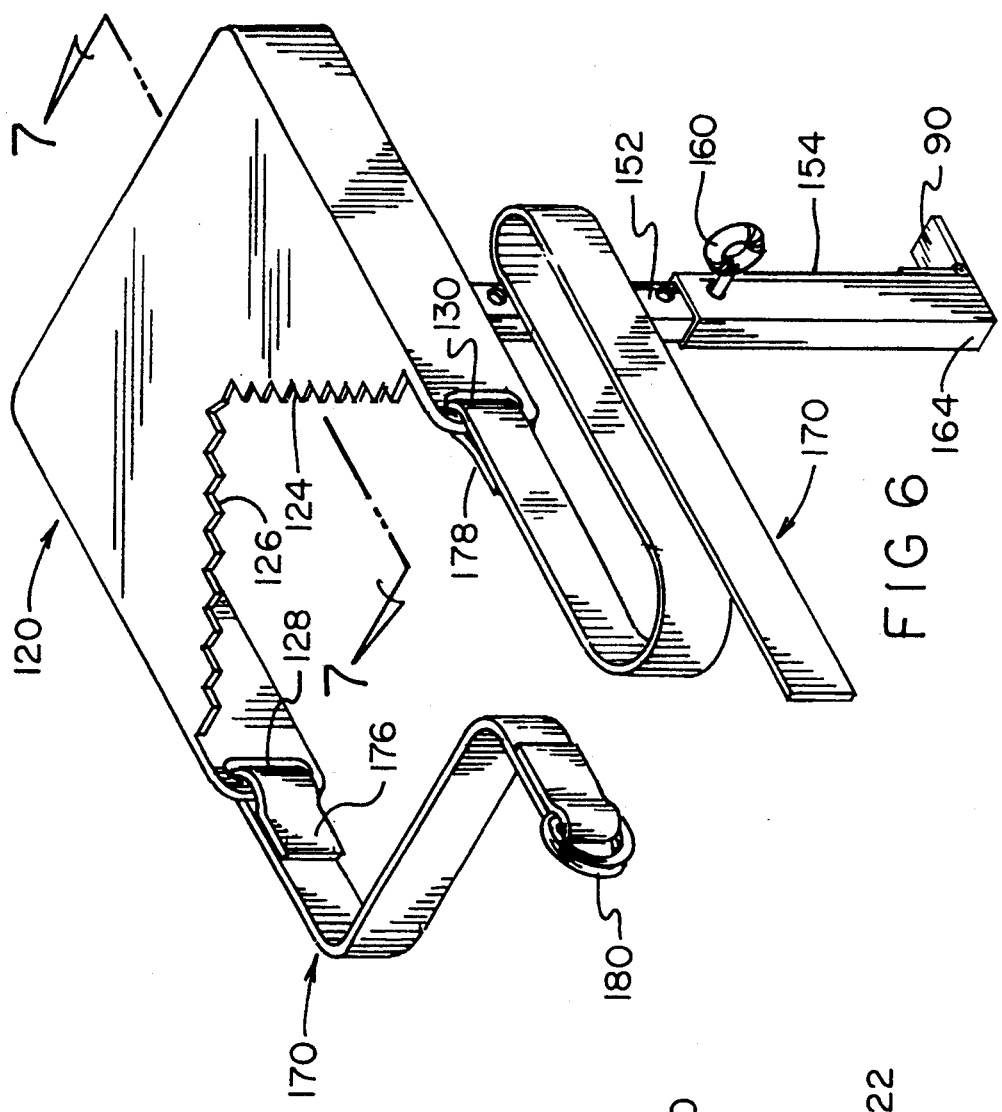
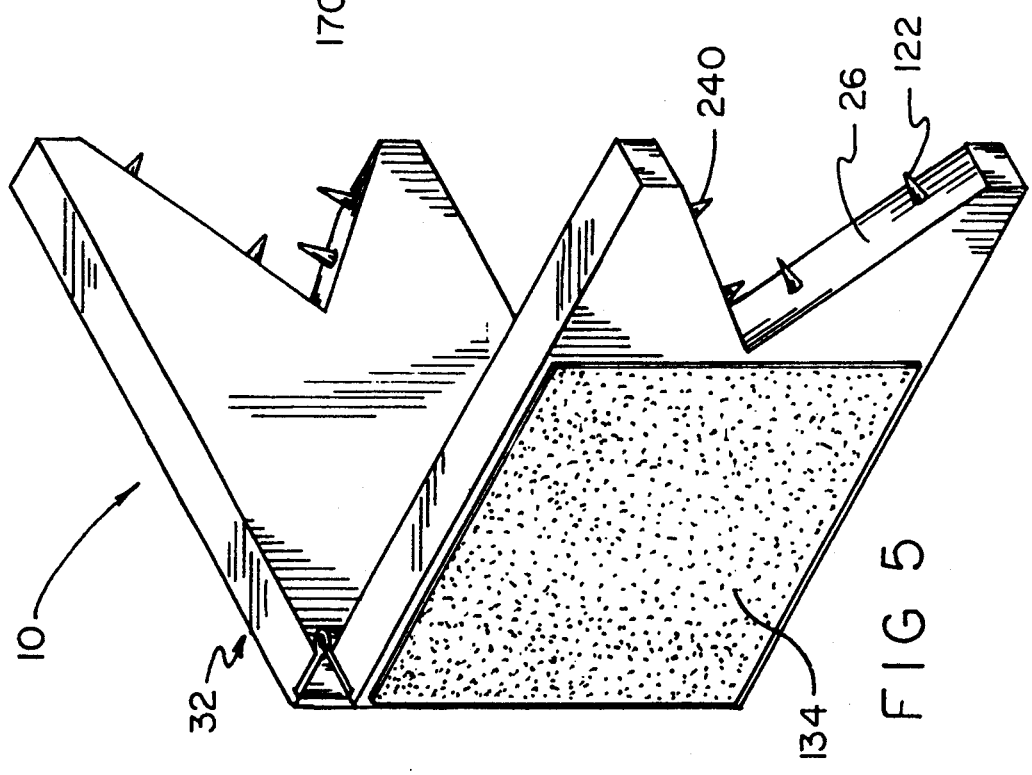

5,427,201

PORTABLE WEDGING TREE STAND

BACKGROUND OF THE INVENTION

1. Field of the Invention

The present invention relates to hunting stands and platforms and more particularly pertains to a portable wedging tree stand which may be adapted for providing a small lightweight foldable tree fork engaging support for elevating an outdoor enthusiast above ground level for hunting, photography, bird watching, and the like.

2. Description of the Prior Art

The use of hunting stands and platforms is known in the prior art. More specifically, hunting stands and platforms heretofore devised and utilized for the purpose of supporting a person elevated above ground level using a tree as the vertical support member are known to consist basically of familiar, expected and obvious structural configurations, notwithstanding the myriad of designs encompassed by the crowded prior art which have been developed for the fulfillment of countless objectives and requirements.

The present invention is directed to improving devices for supporting a person elevated above ground level using a tree as the vertical support member in a manner which is safe, secure, economical and aesthetically pleasing.

For example, U.S. Pat. No. 4,582,165 to Latini discloses a pack frame and tree stand comprised of two major components. A back engaging support platform serves as the pack frame in the back pack mode and as the tree engaging support platform in the tree stand mode. A pack carrying seat is the second main component and is carried by spaced framework members which are pivotally attached to the back engaging support platform. In the back pack mode this second component forms a shelf upon which a pack can be placed. By being rotated through generally about 90°, the pack carrying seat becomes the seat portion of the tree stand. The stand is attachable to a tree by a tree encircling line which is carried by, and is securable to the frame of the seat of the tree stand.

U.S. Pat. No. 4,549,635 to Early describes a portable folding hunting stand comprised of a rigid U-shaped tubular platform and a rigid elongated tubular seat support member foldably connected thereto. The seat support member has a plate at one end and a padded seat rotatably mounted on the other end. A link chain secured at one end of the plate is looped around the vertically extending member and had the other end releasably received in a slot in the plate to attach the erected stand in a substantially horizontal position.

Both of the stands disclosed above are assembled from numerous intricate parts to produce a relatively complex and costly device. Additionally, the inventions shown are not tree fork engaging, but rather rely on a less than fail-safe tree encircling line or chain as the sole support member for both the stand and human load.

The prior art also discloses a tree climbing stand as shown in U.S. Pat. No. 4,331,216 to Amacker, a tree stand of U.S. Pat. No. 4,597,473 to Peck, and a wedging tree stand described in U.S Pat. No. 5,016,733 to Bradley.

While these devices fulfill their respective, particular objectives and requirements, the aforementioned patents do not disclose a portable wedging tree stand. Furthermore, none of the prior art hunting stands and platforms teach or suggest a tree fork engaging support for elevating an outdoor enthusiast above ground level for hunting, photography, bird watching, and the like.

In this respect, the portable wedging tree stand according to the present invention substantially departs from the conventional concepts and designs of the prior art, and in so doing provides an apparatus primarily developed for the purpose of providing a small lightweight foldable tree fork engaging support for elevating an outdoor enthusiast above ground level for hunting, photography, bird watching, and the like.

Therefore, it can be appreciated that there exists a continuing need for new portable wedging tree stands which can be used for providing a small lightweight foldable tree fork engaging support for elevating an outdoor enthusiast above ground level for hunting, photography, bird watching, and the like. In this regard, the present invention substantially fulfills this need.

As illustrated by the background art, efforts are continuously being made in an attempt to develop devices for supporting a person elevated above ground level using a tree as the vertical support member. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of hunting stands and platforms now present in the prior art, the present invention provides a new hunting stands and platforms construction wherein the same can be utilized for providing a small lightweight foldable tree fork engaging support for elevating an outdoor enthusiast above ground level for hunting, photography, bird watching, and the like. As such, the general purpose of the present invention, which will be described subsequently in greater detail, is to provide a new portable wedging tree stand apparatus and method which has all the advantages of the prior art hunting stands and platforms and none of the disadvantages.

The invention is defined by the appended claims with the specific embodiment shown in the attached drawings. For the purpose of summarizing the invention, the invention may be incorporated into a new portable wedging tree stand for providing a small lightweight foldable tree fork engaging support for elevating an outdoor enthusiast above ground level for hunting, photography, bird watching, and the like. The portable wedging tree stand comprises a platform whereupon the user may stand. The platform comprises a generally rectangular metal frame constructed of tubular material having a longitudinal V-shaped notch formed in both ends thereof wherein tree trunk fork members may be engaged. The frame is separated laterally into two essentially identical halves. A top planar surface of sheet metal is fixedly attached to the each half of the frame, the top surface having perforations therethrough wherethrough water may drain. The perforations also provide secure footing during slippery conditions. A plurality of tree surface piercing teeth extends longitudinally from the notched ends of the platform whereby the platform may be stabilized to prevent unwanted rocking motion during use. Hinge means pivotally connect the two frame halves together whereby the halves may be rotated downwardly to lie adjacent each other for storage and transport. The hinge means also enables a leveraged wedging action of the two halves during installation of the platform in the tree fork whereby the longitudinal tree surface piercing teeth may be firmly set into the tree. A sling extends from one corner of the platform to the diagonally opposing corner thereof, one end of the sling being fixedly connected to each corner of the platform whereby the portable wedging tree stand may be suspended from the user's shoulder for easy transport thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a portable wedging tree stand for providing a small lightweight foldable tree fork engaging support for elevating an outdoor enthusiast above ground level for hunting, photography, bird watching, and the like.

It is another object of the present invention to provide a new portable wedging tree stand which may be easily and efficiently manufactured and marketed.

It is a further object of the present invention to provide a new portable wedging tree stand which is of a durable and reliable construction.

An even further object of the present invention is to provide a new portable wedging tree stand which is susceptible of a low cost of manufacture with regard to both materials and labor, and which accordingly is then susceptible of low prices of sale to the consuming public, thereby making such portable wedging tree stands economically available to the buying public.

Still yet another object of the present invention is to provide a new portable wedging tree stand which provides in the apparatuses and methods of the prior art some of the advantages thereof, while simultaneously overcoming some of the disadvantages normally associated therewith.

Still yet another object of the present invention is to provide a new portable wedging tree stand that is extremely lightweight and compact so the user may easily carry it for extended periods of time without tiring.

Yet another object of the present invention is to provide a new portable wedging tree stand that is extremely simple to set up and break down so it may be quickly and easily moved from spot to spot.

Even still another object of the present invention is to provide a new portable wedging tree stand that is stable and safe in that it uses the inherently safe fork of the tree for support.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of the new wedging tree stand shown in the extended operational position.

FIG. 2 is a sectional view of the invention of FIG. 1 taken along the line 2—2 and illustrating the manner of hinge operation.

FIG. 5 is a perspective view of an alternate embodiment of the present invention wherein the platform is constructed of hardwood.

FIG. 6 is a top perspective view of the detachable stool of an embodiment of the present invention.

DESCRIPTION OF THE PREFERRED EMBODIMENT

Figure 3:
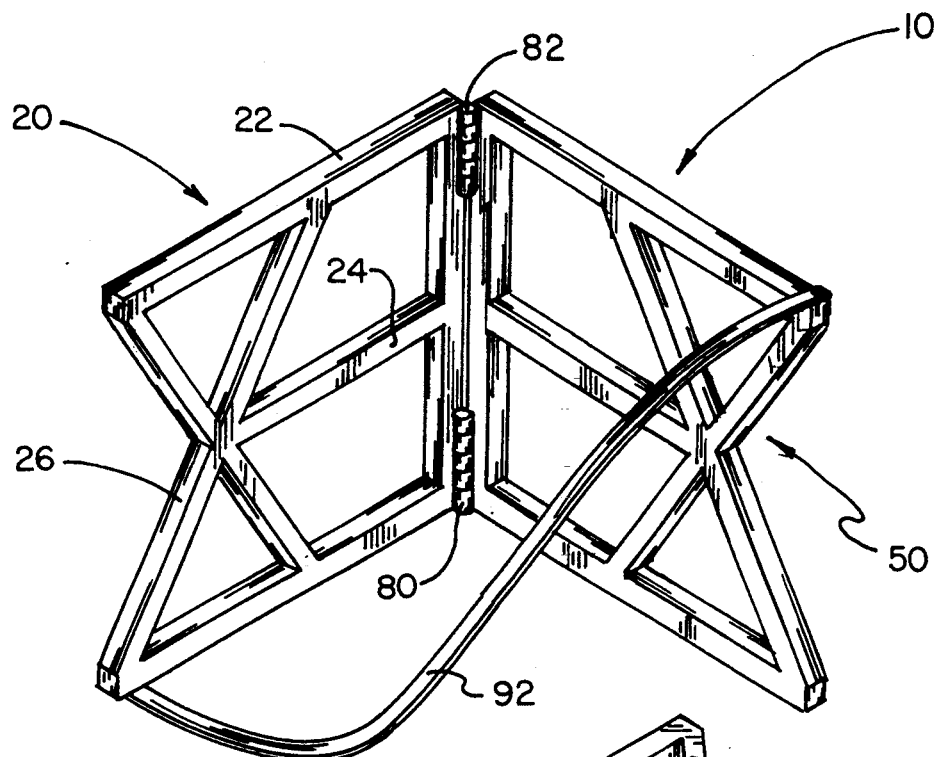
FIG. 3 is a bottom perspective view of the invention of FIG. 1 showing the manner of construction of the partially folded platform frame and the manner of attachment of the sling.
Figure 4:
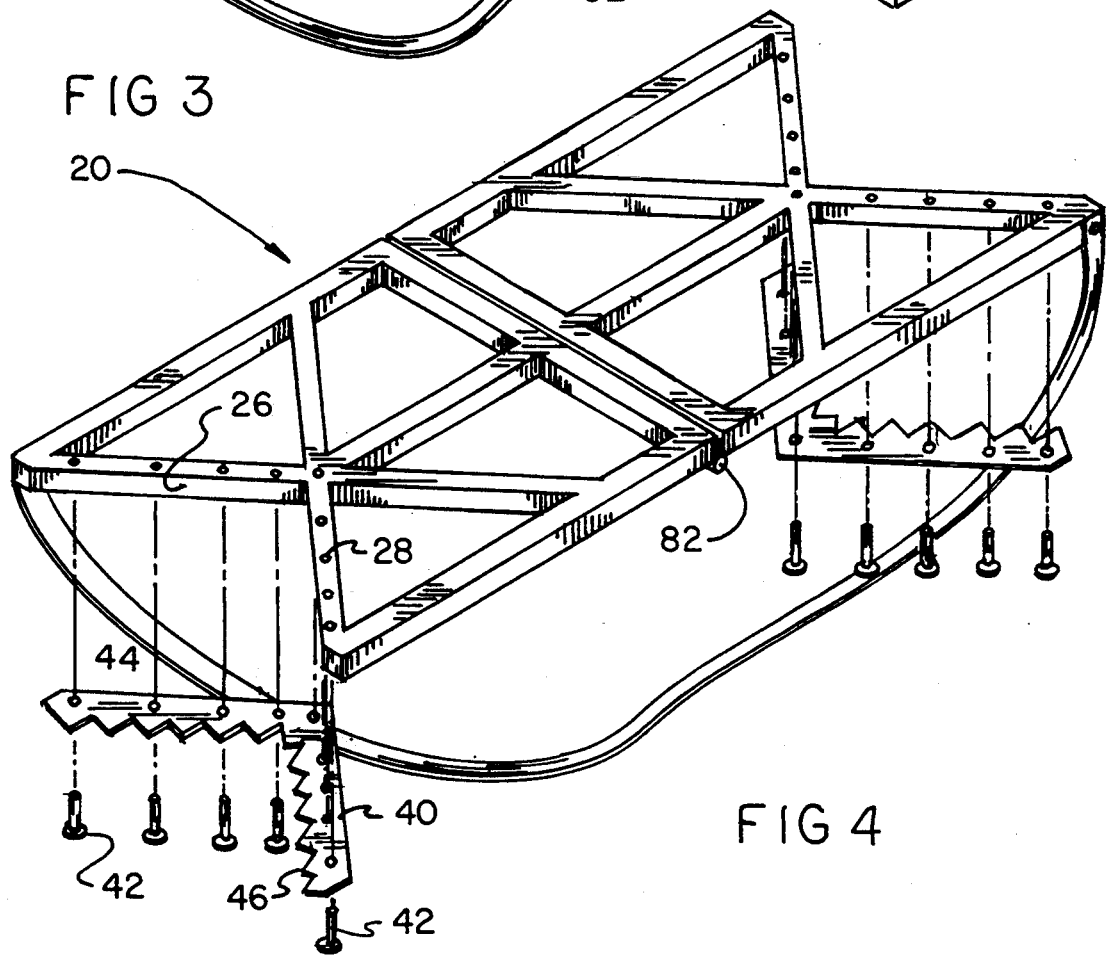
FIG. 4 is a top perspective view of the invention of FIG. 3 showing the manner of attachment of the tree surface piercing teeth.
Figure 7:
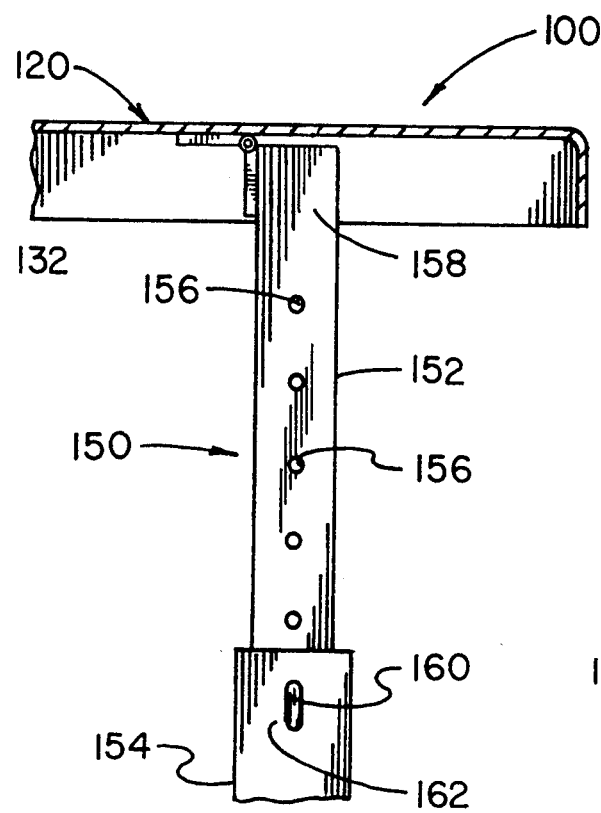
FIG. 7 is a sectional view of the invention of FIG. 6 taken along the line 7—7 and showing the manner of seat height adjustment.

With reference now to the drawings, and in particular to FIG. 1 thereof, a new portable wedging tree stand embodying the principles and concepts of the present invention and generally designated by the reference numeral 10 will be described.

Figure 8:
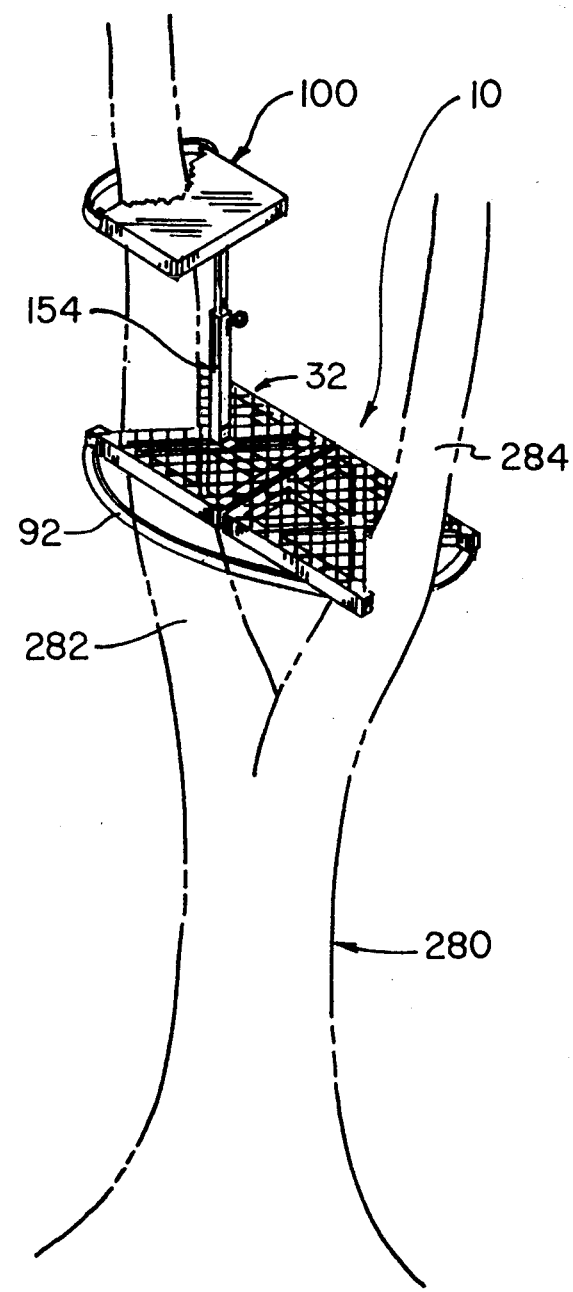
FIG. 8 is a perspective view of the present invention showing its manner of installation in the fork of a tree.

From an overview standpoint, the portable wedging tree stand is adapted for use for providing a small lightweight foldable tree fork engaging support for elevating an outdoor enthusiast above ground level for hunting, photography, bird watching, and the like. See FIG. 8.

With reference now to FIGS. 1–4 and more specifically, it will be noted that a new portable wedging tree stand is shown. The portable wedging tree stand 10 comprises a platform 32 whereupon the user may stand. The platform 32 comprises a generally rectangular metal frame 22 constructed of tubular material having a longitudinal V-shaped notch 26 formed in both ends thereof wherein tree trunk fork members may be engaged. The frame 32 is separated laterally into two essentially identical halves 20 and 50. A top planar surface 30 of sheet metal is fixedly attached to the each half of the frame 32, the top surface 30 having perforations 34 therethrough wherethrough water may drain.

The perforations 34 also provide secure footing during slippery conditions. A metal V-shaped plate 40 having a plurality of tree surface piercing teeth 46 formed thereon is fixedly connected to each of the notched ends 26 with a plurality of rivets 42 such that the teeth 46 extend longitudinally from the notched ends 26 of the platform 32 whereby the platform may be stabilized to prevent unwanted rocking motion during use. A pair of hinges 80 and 82 pivotally connect the two frame halves 20 and 50 together whereby the halves may be rotated downwardly to lie adjacent each other for storage and transport.

The hinges 80 and 82 enable a leveraged wedging action of the two halves 20 and 30 during installation of the stand 10 in the tree fork whereby the longitudinal tree surface piercing teeth 40 may be firmly set into the tree. A sling 92 extends from one corner 94 of the platform 32 to the diagonally opposing corner 96 thereof, one end of the sling 92 being fixedly connected to each corner of the platform whereby the portable wedging tree stand 10 may be suspended from the user's shoulder for easy transport thereof.

Referring additionally to FIGS. 5–8, in an alternate embodiment the portable wedging tree stand 10 further includes a lower support member 154 extending upwardly from the platform 32 for receiving a stool attachment 100. The lower support member 154 is formed of square tubing and is connected at the bottom end 164 thereof with a hinge 90 located central the top of the platform, proximal one end thereof, such that the lower support member 154 may pivot relative the longitudinal axis of the platform 32.

A detachable stool 100, whereupon the user may sit during use of the stand 10, comprises a generally square seat platform 120 constructed of rigid lightweight material having a V-shaped notch 124 formed in one end thereof wherein a tree trunk fork member 282 may be engaged. A plurality of tree surface piercing teeth 126 projects longitudinally from the notched end 124 of the seat 120 whereby the seat may be stabilized to prevent unwanted motion during use.

A seat retaining strap 170 is included for cinching the tree fork member 282 securely into the V-shaped notch 124 to improve stability of the seat 120. The retaining strap 170 has one end 176 fixedly connected to a corner of the seat 128 adjacent the V-shaped notch 124, the other end of the strap 178 being fixedly connected to the other corner 130 of the seat adjacent the V-shaped notch 124. The strap 170 also has separable connector means 180 intermediate the ends thereof for facilitating strap encirclement of the tree fork member 282.

An upper support member 152 extends downwardly from the seat 120. The upper support member 152 is formed of square tubing and is connected at the upper end 158 thereof with a hinge 132 located essentially central the bottom of the seat 120 such that the upper support member 152 may pivot toward and away from the V-shaped notch 124. The upper support member 152 is removably telescopically disposed within the lower support member 154 whereby the seat 120 is supported in spaced relationship generally above the platform 32 when operationally positioned. The stool 100 is detachable from the platform 32 for storage and transport by sliding the telescoped support members 152 and 154 fully apart from each other.

The combined support members 152 and 154 have locking means for adjusting the upper support member 152 to any of a plurality of discrete extensible positions relative the lower support member 154 whereby the vertical spacing of the seat 120 above the platform 32 may be adjusted. The locking means comprises a plurality of longitudinally spaced apart transverse holes 156 through the upper support member 152. The lower support member 154 has a transverse hole 162 therethrough proximal the upper end thereof which is alignable with any of the plurality of transverse holes 156 through the upper support member 152. A locking pin 160 removably extends through the transverse hole 162 of the lower support member 154 and also removably extends through one of the plurality of transverse holes 156 through the upper support member 152 whereby the height of the seat 120 may be set relative the platform 32.

In use, the combined pivotal action of the two hinges 90 and 132, located at the upper and lower ends 158 and 164 of the combined support members 152 and 154, allow the seat 120 to be adjusted relative the longitudinal axis of the platform 32 whereby allowing the stool 100 to be positioned for engagement with tree trunk fork members extending from the tree at various angles.

FIG. 5 shows another embodiment in which the platform 32 of the wedging tree stand 10 is constructed of hardwood. A plurality of tree surface piercing teeth 122 project longitudinally from the notched ends 26 of the platform 32 for improving stabilization of the tree stand 10 during use. Non-slip material 134 is disposed on the top surface of the platform 32 to provide secure footing during slippery conditions.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A new portable wedging tree stand for providing a small lightweight foldable tree fork engaging support for elevating an outdoor enthusiast above ground level for hunting, photography, bird watching, and the like, the portable wedging tree stand comprising:

a platform whereupon the user may stand comprising:

a generally rectangular metal frame constructed of tubular material having a longitudinal V-shaped notch formed in both ends thereof wherein tree trunk fork members may be engaged, the frame being separated laterally into two essentially identical halves;

a top planar surface of sheet metal fixedly attached to each half of the frame, the top surface having perforations therethrough wherethrough water may drain and for providing secure footing during slippery conditions;

a plurality of tree surface piercing teeth extending longitudinally from each of the notched ends of the platform whereby the platform may be stabilized to prevent unwanted rocking motion during use;

hinge means pivotally connecting the two frame halves together whereby the halves may be rotated downwardly to lie adjacent each other for storage and transport, the hinge means also enabling a leveraged wedging action of the two halves during installation of the platform in the tree fork whereby the longitudinal tree surface piercing teeth may be firmly set into the tree;

a sling extending from one corner of the platform to the diagonally opposing corner thereof, one end of the sling being fixedly connected to each corner of the platform whereby the portable wedging tree stand may be suspended from the user's shoulder for easy transport thereof; and a tubular support member extending upwardly from the platform, the support member being hingedly connected at the bottom end thereof to the top of the platform proximal one end thereof such that the support member may pivot relative the longitudinal axis of the platform.

2. The portable wedging tree stand of claim 1 and further including a detachable collapsible stool whereupon the user may sit during use of the stand, the stool comprising: a generally square seat platform constructed of rigid lightweight material having a V-shaped notch formed in one end thereof wherein a tree trunk fork member may be engaged; a plurality of tree surface piercing teeth projecting longitudinally from the notched end of the seat whereby the seat may be stabilized to prevent unwanted motion during use; a seat retaining strap for cinching the tree fork member securely into the V-shaped notch to improve stability of the seat, the retaining strap having one end fixedly connected to a corner of the seat adjacent the V-shaped notch, the other end of the strap being fixedly connected to the other corner of the seat adjacent the V-shaped notch, the strap also having separable connector means intermediate the ends thereof for facilitating strap encirclement of the tree fork member; and said tubular support member comprising an upper and lower tubular support member, the an upper tubular support member extending downwardly from the seat, the upper support member being hingedly connected at the upper end thereof essentially central the bottom of the seat such that the upper support member may pivot toward and away from the V-shaped notch of the seat, the upper support member being removably telescopically disposed within the lower support member whereby the seat is supported in spaced relationship generally above the platform when operationally positioned, the upper support member having a plurality of lockable discrete extensible positions relative the lower support member whereby the spacing of the seat above the platform may be adjusted.

3. A new portable wedging tree stand for providing a tree fork engaging support for elevating an outdoor enthusiast above ground level for hunting, photography, bird watching, and the like, the portable wedging tree stand comprising a platform whereupon the user may stand, the platform having a longitudinal V-shaped notch formed in opposing ends thereof wherein tree trunk fork members may be engaged;

the platform comprising a generally rectangular metal frame constructed of tubular material having a top planar surface of sheet metal fixedly attached to the frame;

the top surface having perforations therethrough wherethrough water may drain and for providing secure footing during slippery conditions;

a plurality of tree surface piercing teeth extending longitudinal from the notched ends of the platform whereby the platform may be stabilized to prevent unwanted rocking motion during use;

the platform being foldable laterally in half for storage and transports the foldability also enabling a leveraged wedging action of the two halves during installation of the platform in the tree fork whereby the longitudinal tree surface piercing teeth may be firmly set into the tree;

a sling extending from one corner of the platform to the diagonally opposing corner thereof, one end of the sling being fixedly connected to each corner of the platform whereby the portable wedging tree stand may be suspended from the user's shoulder for easy transport thereof;

a tubular support member extending upwardly from the platform, said tubular support member comprising an upper and lower tubular support member, the lower support member being hingedly connected at the bottom end thereof to the top of the platform proximal one end thereof such that the lower support member may pivot relative the longitudinal axis of the platform;

a detachable stool whereupon the user may sit during use of the stand; and the stool comprising a generally square seat platform constructed of rigid lightweight material having a V-shaped notch formed in one end thereof wherein a tree trunk fork member may be engaged; a plurality of tree surface piercing teeth projecting longitudinally from the notched end of the seat whereby the seat may be stabilized to prevent unwanted motion during use; a seat retaining strap for cinching the tree fork member securely into the V-shaped notch to improve stability of the seat; and said upper tubular support member extending downwardly from the seat, the upper support member being hingedly connected at the upper end thereof essentially central the bottom of the seat such that the upper support member may pivot toward and away from the V-shaped notch, the upper support member being removably telescopically disposed within the lower support member whereby the seat is supported in spaced relationship generally above the platform when operationally positioned.

4. The portable wedging tree stand of claim 3 wherein the retaining strap has one end fixedly connected to a corner of the seat adjacent the V-shaped notch, the other end of the strap being fixedly connected to the other corner of the seat adjacent the V-shaped notch, the strap also having separable connector means intermediate the ends thereof for facilitating strap encirclement of the tree fork member.

5. The portable wedging tree stand of claim 4 wherein the upper support member has a plurality of lockable discrete extensible positions relative the lower support member whereby the spacing of the seat above the platform may be adjusted.

* * * * *